United States Patent [19]
Jones et al.

[11] Patent Number: 5,982,588
[45] Date of Patent: Nov. 9, 1999

[54] ELONGATED REAR BEARING FOR LINEAR ACTUATOR

[75] Inventors: David E. Jones, Layton; Thomas J. Angellotti, Ogden; John C. Briggs, Layton; Paul Johnson, Kaysville; Yiping Ma, Layton; Carl F. Nicklos, Ogden; Mark S. Thayne, West Point, all of Utah

[73] Assignee: Iomega Corporation, Roy, Utah

[21] Appl. No.: 08/866,758

[22] Filed: May 30, 1997

[51] Int. Cl.⁶ ....................................................... G11B 5/55
[52] U.S. Cl. .............................................................. 360/106
[58] Field of Search ................................... 360/106, 107, 360/109; 369/219, 220, 255

[56] References Cited

U.S. PATENT DOCUMENTS

| | | | |
|---|---|---|---|
| 4,504,879 | 3/1985 | Toldi et al. | 360/105 |
| 4,663,677 | 5/1987 | Griffith et al. | 360/71 |
| 4,663,682 | 5/1987 | McNeil | 360/105 |
| 4,683,506 | 7/1987 | Toldi et al. | 360/105 |
| 4,722,012 | 1/1988 | Toldi et al. | 360/97 |
| 4,740,851 | 4/1988 | Jones et al. | 360/97 |
| 4,787,000 | 11/1988 | Schulze | 360/105 |
| 4,811,143 | 3/1989 | Ohashi et al. | 360/105 |
| 4,901,173 | 2/1990 | Jones et al. | 360/99.04 |
| 4,965,685 | 10/1990 | Thompson et al. | 360/97.01 |
| 5,016,238 | 5/1991 | Shtipelman et al. | 369/215 |
| 5,027,241 | 6/1991 | Hatch et al. | 360/105 |
| 5,291,359 | 3/1994 | Wolter | 360/104 |
| 5,434,459 | 7/1995 | Pinkerton | 310/20 |
| 5,491,684 | 2/1996 | Terashima et al. | 369/219 |
| 5,508,864 | 4/1996 | Briggs et al. | 360/106 |
| 5,530,607 | 6/1996 | Spendlove | 360/105 |
| 5,588,757 | 12/1996 | Unosawa et al. | 400/279 |

*Primary Examiner*—George J. Letscher
*Attorney, Agent, or Firm*—Woodcock Washburn Kurtz Mackiewicz & Norris LLP

[57] ABSTRACT

A linear actuator carries read/write heads into engagement with a removable cartridge having a recording disk. The magnetic heads are mounted on a carriage which moves linearly on a central guide track. The carriage moves linearly on front and rear bearings which move on a central guide track as the magnetic motor is energized. The rear bearing is elongated in the direction perpendicular to the plane of the disk to allow movement of the carriage transverse to the direction of travel. This compensates for planar misalignment of the plane of the recording disk with respect to the axis of the central track.

8 Claims, 7 Drawing Sheets

ELONGATED REAR BEARING FOR LINEAR ACTUATOR

BACKGROUND OF THE INVENTION

This invention relates to a linear actuator for carrying read/write heads into engagement with a recording medium and more particularly to a linear actuator which has an elongated rear bearing which compensates for minor misalignment of the recording medium plane with respect to the axis of the actuator.

U.S. Pat. No. 5,530,607 and pending application Ser. No. 08/727,128 filed Oct. 8, 1996, "Actuator for Data Storage Device", Jones, et al. show a linear actuator for a removable media magnetic disk drive. Such drives are commonly referred to as ZIP™ drives made by Iomega Corporation.

In these drives a linear actuator carries magnetic heads into engagement with a floppy disk. The carriage which carries the magnetic heads travels on a central guide track which is on the axis of the actuator. This alignment of the plane of the floppy disk with respect to the actuator axis is important. Misalignment of the heads with respect to the tracks on the disk may cause read/write problems.

It is an object of the present invention to provide a linear actuator which obviates the foregoing problem.

The actuator of the ZIP™ drive has been modified to make the actuator smaller so that it can be used, for example, in lap top computers. The smaller sized actuator is described in, copending application Ser. No. 08/866,168, "Combination/Bearing Flexure For Friction Reduction and Friction Linearization in Linear Actuator for Disk Drive", Nicklos, et al. and in other applications, which have been filed concurrently herewith.

It is a further object of the present invention to provide an improved linear actuator which obviates the disk misalignment problem in drives of the ZIP™ type and in the smaller drives suitable for laptop computers.

SUMMARY OF THE INVENTION

In accordance with the present invention a rear bearing for the carriage in a linear actuator is elongated to allow vertical (Z-axis) motion of the carriage. This compensates for misalignment of the plane of the disk with respect to the axis of the actuator. The elongated rear bearing eliminates adjustment of the actuator Z-height necessitated by planar misalignment of the disk.

The rear bearing has the same Y-axis diameter at its center, i.e. at the X-axis, axis as the front, round bearing. Both front and rear bearings are press-fit into the carriage assembly.

The foregoing objects, features and advantages of the invention will be better understood from the following more detailed description and appended claims.

SHORT DESCRIPTION OF THE DRAWINGS

Figure 7:
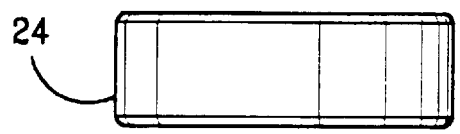
Figure 7A:
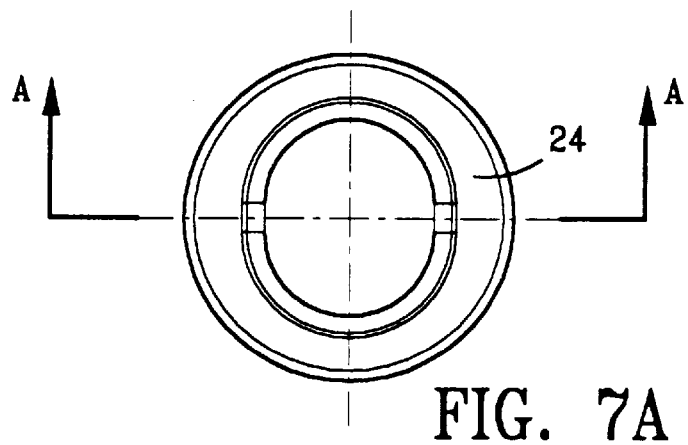
Figure 7B:
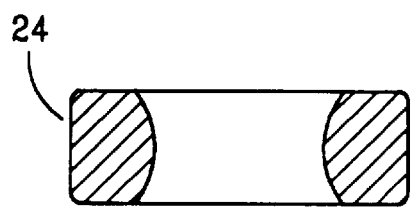
Figure 7C:
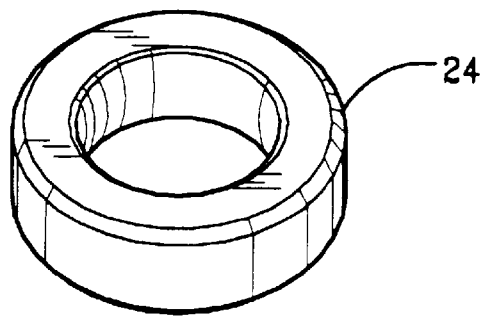
Figure 8:
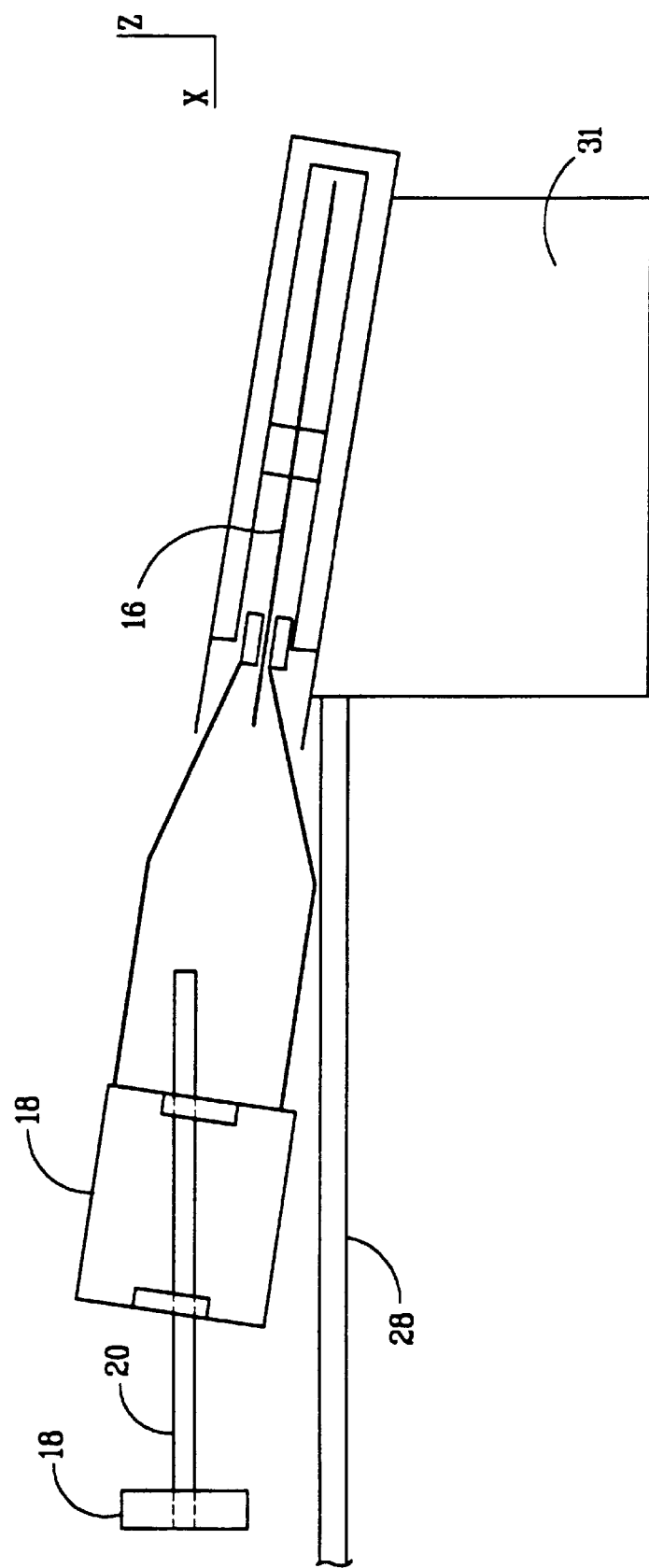

FIGS. 7, 7A, 7B, and 7C show plan, top, section and perspective views of the rear bearing; and FIG. 8 depicts the misalignment of the disk with respect to the axis of the actuator.

DESCRIPTION OF THE PREFERRED EMBODIMENT

Figure 1:
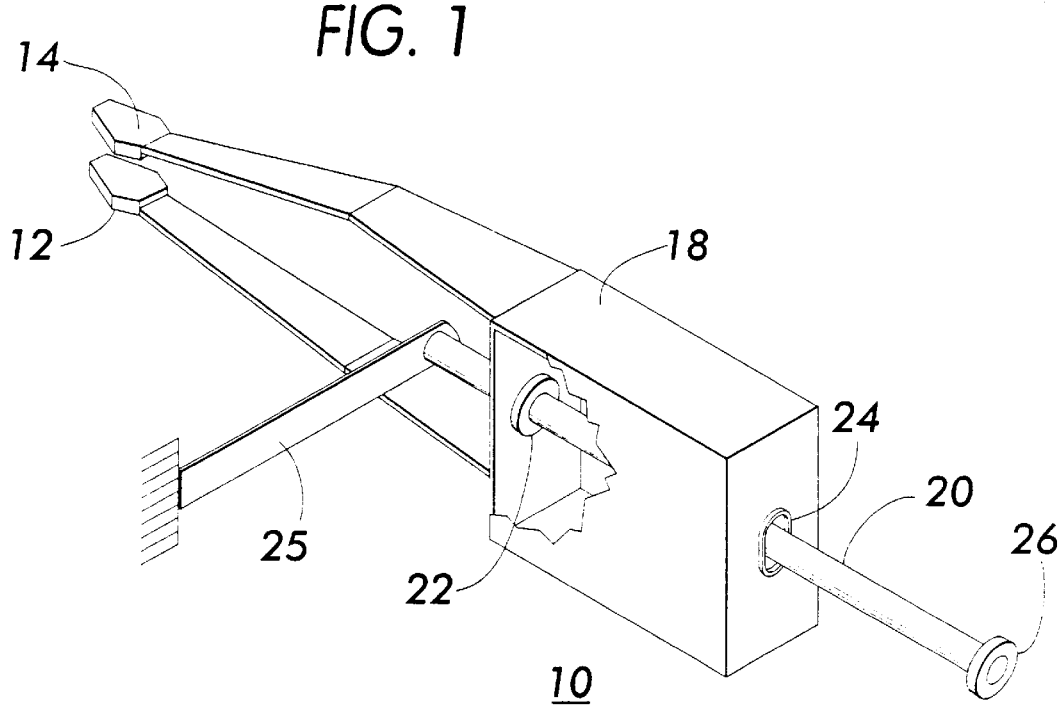
FIG. 1 shows a simplified perspective view and FIG. 2 shows a simplified plan view of the actuator of the present invention.
Figure 2:
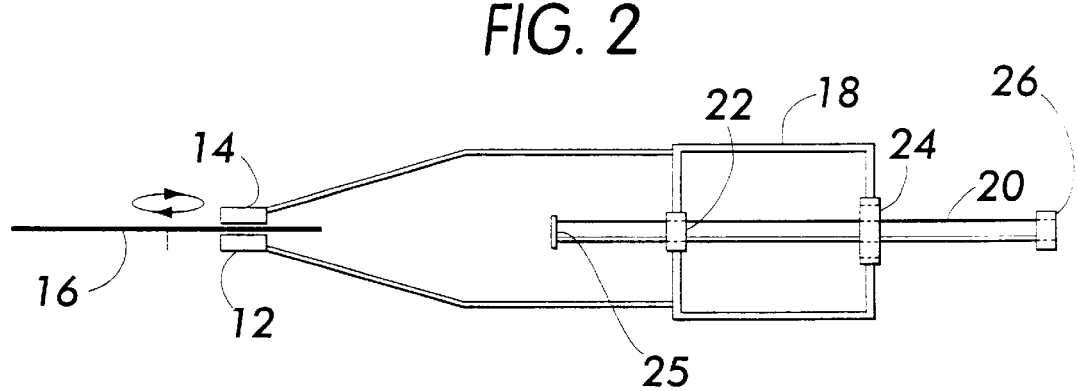

FIGS. 1 and 2 depict an actuator 10 for carrying read/write heads 12 and 14 into engagement with a recording medium 16 which is a floppy disk. The heads 12 and 14 are mounted on the carriage 18 which moves linearly on the central guide track 20. Carriage 18 moves linearly on a front bearing 22 and a rear bearing 24. Central guide track 20 is suspended in the drive on the front flexure 25 and the rear mounting bearing 26. Central guide track 20 is free to move axially, x direction, on flexure 25 and rear mounting bearing 26. Guide track 20 extends through front and rear bearings 22 and 24 so that the carriage moves linearly on the guide track as the magnetic motor (not shown in FIGS. 1 and 2) is energized.

In accordance with the invention the rear bearing 24 is elongated in the direction perpendicular to the plane of the recording disk (Z-axis). Because of the elongation in the Z-axis, the carriage 18 can move transverse to the direction of travel of the carriage to compensate for planar misalignment of the plane of the disk 16 with respect to the axis of the central track 20.

Front bearing 22 is round and has a sliding clearance on central guide track 20. The lateral (Y-axis) clearance of rear bearing 24 at the X-axis is the same as the sliding clearance for the front bearing.

Figure 3:
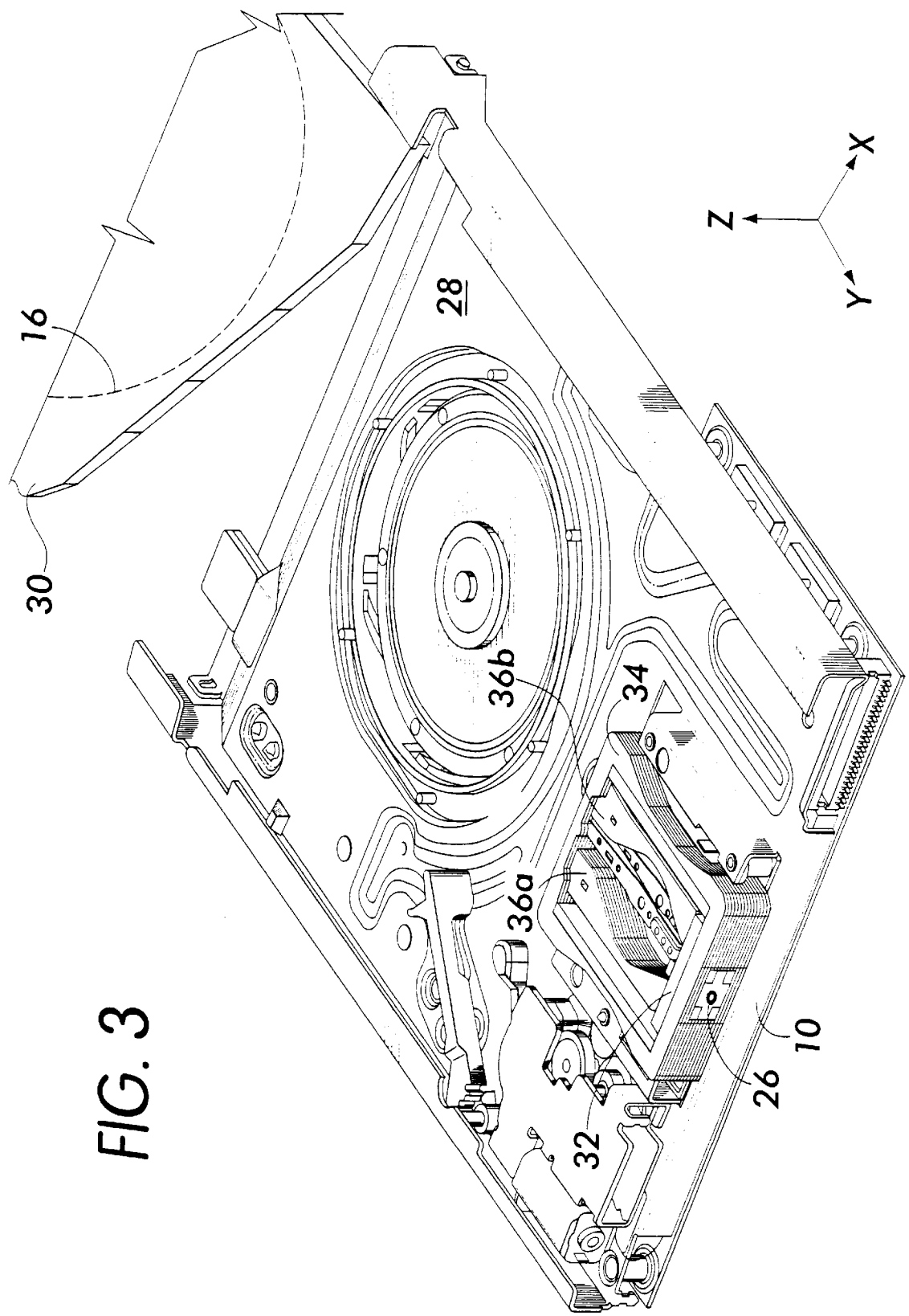
FIG. 3 shows a perspective view of the disk drive and actuator.
Figure 4:
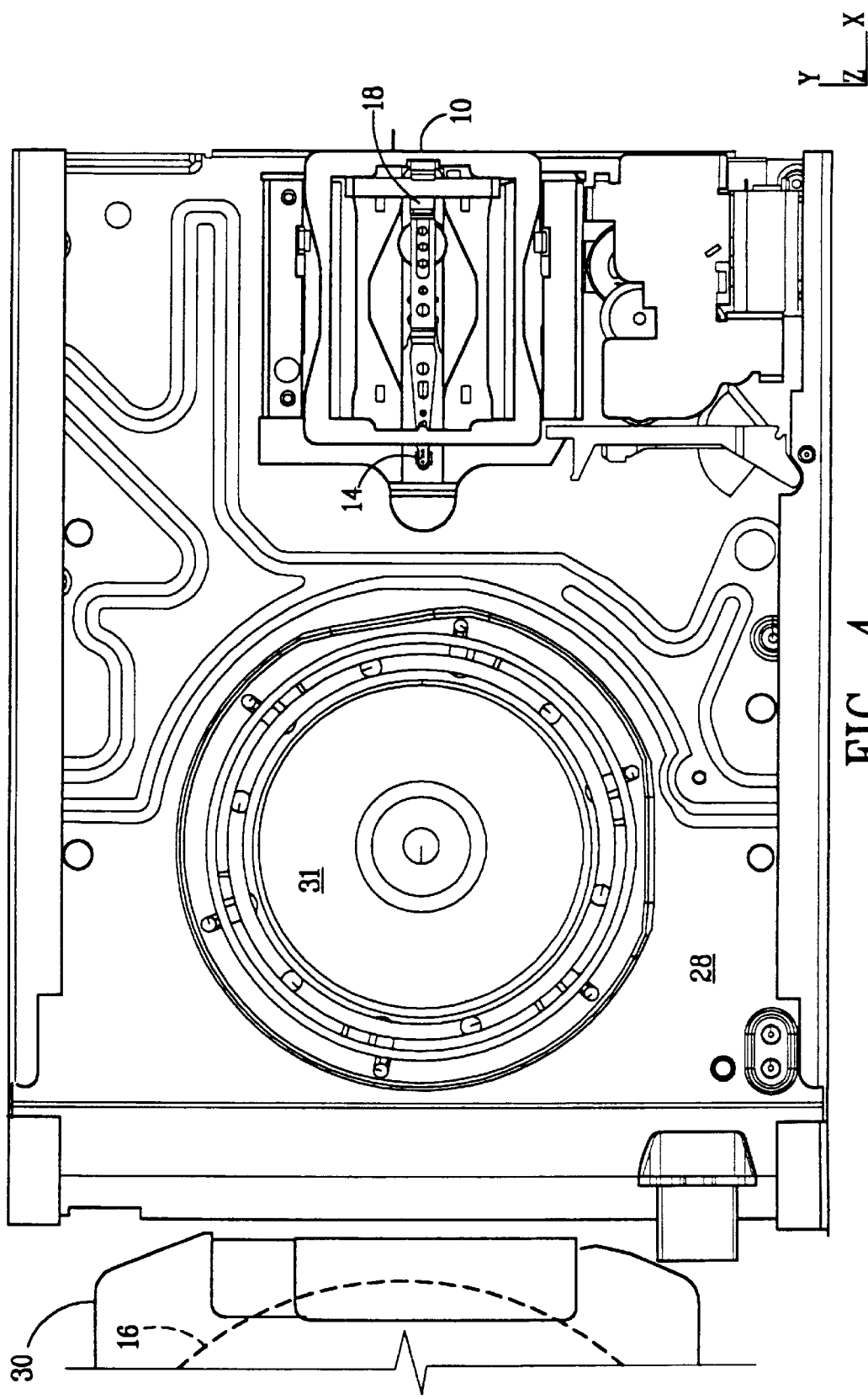
FIG. 4 is a plan view of the disk drive and actuator.

FIGS. 3 and 4 show the actuator of the present invention in a disk drive which has a chassis 28. Actuator 10 is mounted on chassis 28. Recording disk 16 is enclosed in a cartridge 30 which is inserted into the disk drive. Spindle motor 31, mounted on chassis 28, rotates the disk during reading and writing. Recording disk 16 will normally be in a plane parallel to the plane of the chassis 28. However, recording medium (disk) 16 occasionally is out of this plane. In accordance with the present invention the elongation of rear bearing 24 transverse to this plane allows the carriage to move transversely to compensate for this planar misalignment of the recording medium with respect to the axis of the track.

Figure 5:
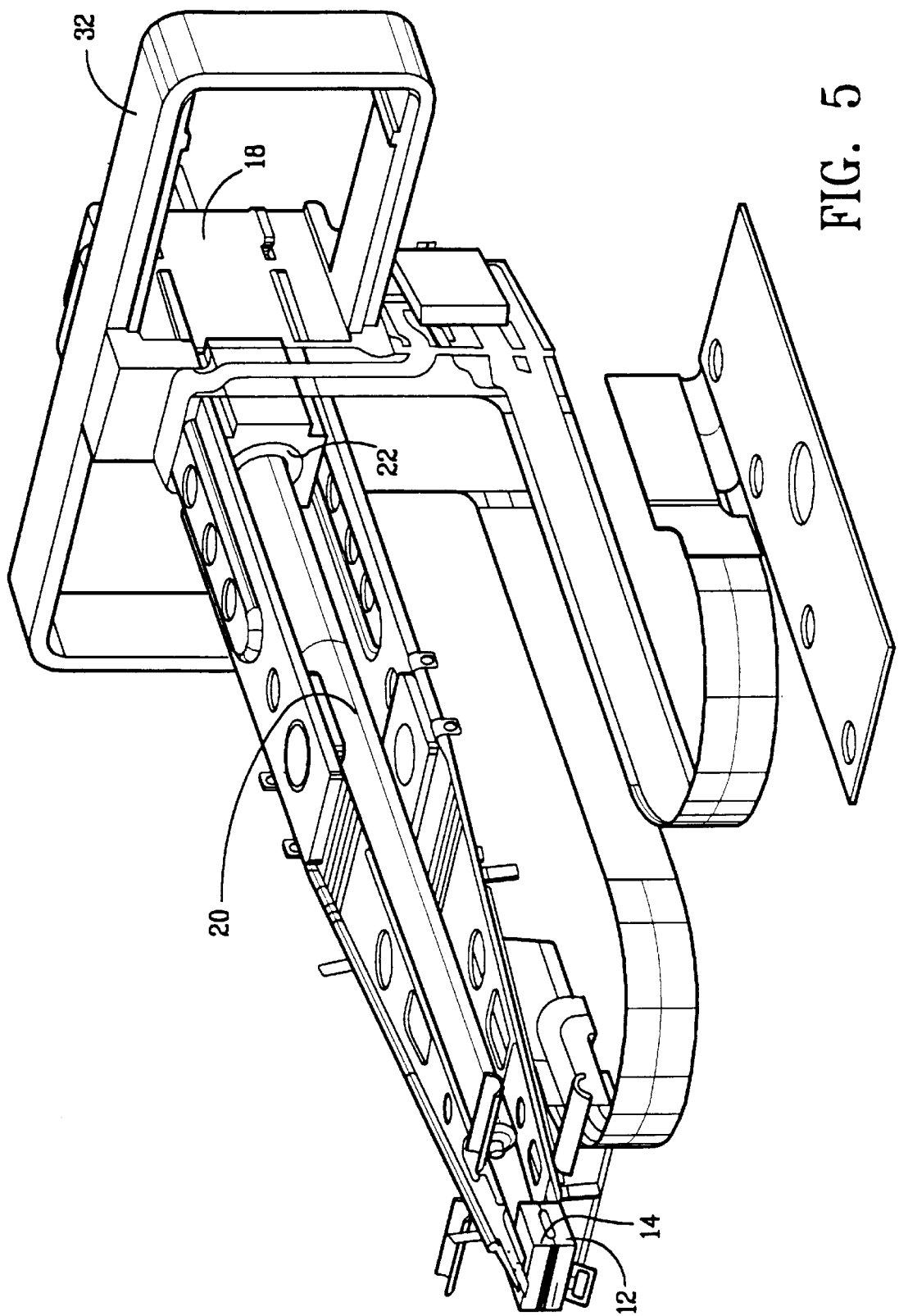
FIG. 5 is a perspective view of the actuator.

FIG. 5 is a perspective view of the actuator which shows the coil 32 of the magnetic motor. Coil 32 is mounted on the carriage 18. When the coil 32 is energized flux interacts with the outer magnetic return path 34 and inner magnetic return path 36a and 36b to move the carriage 18 linearly on the central guide track 20.

Figure 6:
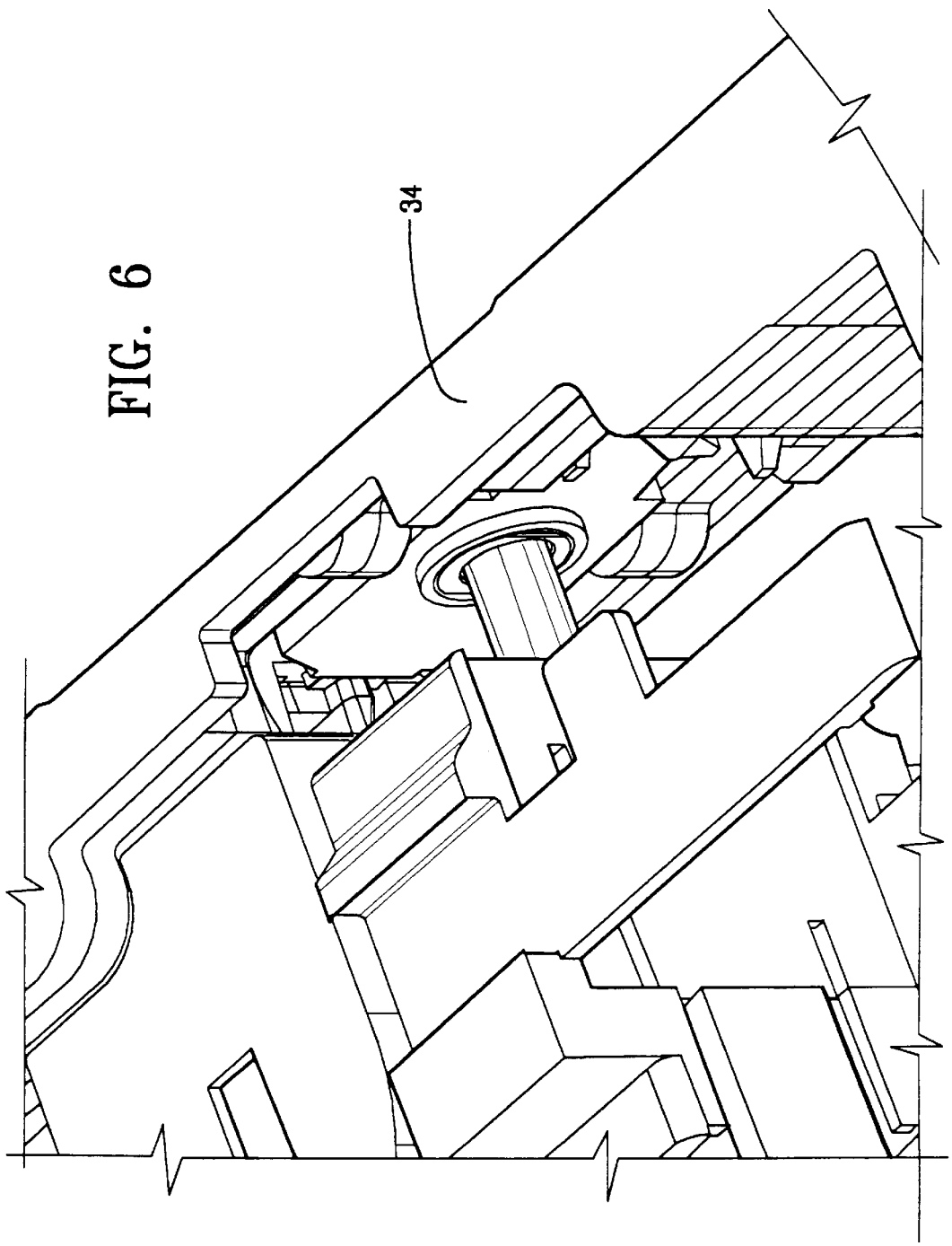
FIG. 6 is a perspective view of the rear bearing.

FIG. 6 shows how the rear bearing 24 is mounted in a press-fit in the rear of the outer magnetic return path 34 of the carriage assembly.

FIGS. 7, 7A, 7B, and 7C show the rear bearing. FIG. 7B is a section on the line A—A of FIG. 7.

FIG. 8 shows how the elongated rear bearing 24 eliminates adjustment of the actuator Z-height. The axis of central guide track 20 is parallel to the plane of chassis 28. Normally, recording disk 16 is also parallel to the plane of the chassis. However, as shown in FIG. 8, the plane of the recording medium can be misaligned with respect to the axis of central guide track 20. When this occurs the elongated rear bearing 24 allows tilt the carriage 18 to accommodate the misalignment.

Modifications of the invention may be made. The dependent claims are, therefore, intended to cover all such modifications within the true spirit and scope of the invention.

We claim:

1. An actuator for carrying a read/write head into engagement with a recording medium comprising:

a carriage, said head being mounted on said carriage;

a magnetic motor for driving said carriage in a direction of travel so that the head moves into and out of engagement with said medium;

a central guide track on which the carriage moves;

front and rear bearings in said carriage, said front bearing being at an end of said carriage closest to said read/write head, said rear bearing being at a rear of said carriage further from said read/write head, said guide track extending through said bearings so that said carriage moves linearly on said guide track as said motor is energized;

said rear bearing being elongated in the direction transverse to said direction of travel to allow movement of the carriage transverse to said direction of travel to compensate for planar misalignment of the plane of said recording medium with respect to the axis of said central guide track; and said front bearing being circular, so that central guide track pivots about the front bearing in the direction transverse to the direction of travel and in the elongated portion of the rear bearing to thereby permit the heads and the central guide track to move to compensate for planar misalignment of the plane of the recording medium with respect to the axis of the central guide track.

2. The actuator recited in claim 1 wherein said front bearing has a sliding clearance on said central guide track.

3. The actuator recited in claim 2 wherein the lateral clearance of said rear bearing is the same as said sliding clearance for said front bearing.

4. The actuator recited in claim 1 wherein said front and rear bearings are secured to said carriage by a press fit.

5. The actuator recited in claim 1 wherein said actuator is mounted on a disk drive chassis and said recording medium is in a cartridge insertable into said disk drive with said recording medium parallel to the plane of said chassis.

6. The actuator recited in claim 5 wherein said rear bearing is elongated transverse to said plane.

7. The actuator recited in claim 5 wherein said central guide track is mounted on a flexure at one end thereof.

8. The actuator recited in claim 7 wherein said central guide track is mounting in a mounting bearing at an other end thereof.

* * * * *